United States Patent
Dorsch et al.

(10) Patent No.: US 8,890,023 B2
(45) Date of Patent: Nov. 18, 2014

(54) METHOD OF VERIFYING SEAM QUALITY DURING A LASER WELDING PROCESS

(75) Inventors: Friedhelm Dorsch, Stuttgart (DE); Holger Braun, Renningen (DE); Dieter Pfitzner, Althengstett (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 283 days.

(21) Appl. No.: 13/604,024

(22) Filed: Sep. 5, 2012

(65) Prior Publication Data
US 2013/0062324 A1     Mar. 14, 2013

(30) Foreign Application Priority Data
Sep. 8, 2011   (EP) .................................... 11180542

(51) Int. Cl.
| | |
|---|---|
| B23K 31/00 | (2006.01) |
| B23K 26/02 | (2014.01) |
| B23K 26/03 | (2006.01) |
| B23K 26/20 | (2014.01) |
| B23K 26/24 | (2014.01) |
| B23K 31/12 | (2006.01) |

(52) U.S. Cl.
CPC ............... *B23K 26/032* (2013.01); *B23K 26/24* (2013.01); *B23K 31/125* (2013.01); *B23K 31/00* (2013.01); *B23K 26/03* (2013.01); *B23K 26/02* (2013.01); *B23K 26/20* (2013.01)
USPC .................. 219/121.64; 219/121.83; 374/121

(58) Field of Classification Search
CPC ........ B23K 26/02; B23K 26/03; B23K 26/20; B23K 26/24; B23K 31/00; B23K 31/125; G01J 5/60
USPC ............... 219/121.6–121.64, 121.83, 121.85; 374/121, 124, 141, 204
See application file for complete search history.

(56) References Cited

U.S. PATENT DOCUMENTS

| | | | | |
|---|---|---|---|---|
| 3,992,943 A | * | 11/1976 | Schiefer et al. | ............... 374/127 |
| 5,539,180 A | * | 7/1996 | Mori et al. | ............... 219/121.64 |

(Continued)

FOREIGN PATENT DOCUMENTS

| | | |
|---|---|---|
| DE | 10225450 A1 | 12/2003 |
| DE | 102005024085 A1 | 11/2006 |

(Continued)

OTHER PUBLICATIONS

Chen et al, "Laser Process Monitoring with Dual Wavelength Optical Sensors", 12288, ICALEO Laser Materials Processing, Nov. 3-8, 1991, San Jose, CA, 10 pages.

*Primary Examiner* — Samuel M Heinrich
(74) *Attorney, Agent, or Firm* — Fish & Richardson P.C.

(57) ABSTRACT

This disclosure relates to verifying a seam quality during a laser welding process. In certain aspects, a method includes detecting, in a spatially resolved manner, a first amount of radiation emerging from a workpiece in a first wavelength range, determining a first geometric parameter of a seam characteristic based on the first amount of radiation detected in the first wavelength range, detecting, in a spatially resolved manner, a second amount of radiation emerging from the workpiece in a second wavelength range, the second wavelength range being different than the first wavelength range, determining a second geometric parameter of the seam characteristic based on the second amount of radiation detected in the second wavelength range, comparing the first and second geometric parameters to respective reference values or to respective tolerance intervals to provide respective comparison results, and logically combining the respective comparison results to verify the seam quality.

11 Claims, 1 Drawing Sheet

(56) References Cited

U.S. PATENT DOCUMENTS

| | | |
|---|---|---|
| 5,580,471 A | 12/1996 | Fukumoto et al. |
| 5,651,903 A | 7/1997 | Shirk |
| 5,674,415 A * | 10/1997 | Leong et al. ............. 219/121.83 |
| 5,938,953 A * | 8/1999 | Jurca ........................ 219/121.83 |
| 6,188,041 B1 | 2/2001 | Kim et al. |
| 6,455,803 B1 * | 9/2002 | Fields et al. ............. 219/121.63 |
| 6,670,574 B1 | 12/2003 | Bates et al. |
| 7,107,118 B2 | 9/2006 | Orozco et al. |
| 8,426,770 B2 * | 4/2013 | Pinon et al. ............. 219/130.01 |
| 2004/0188397 A1 | 9/2004 | Connally et al. |
| 2010/0086003 A1 | 4/2010 | Pfitzner et al. |
| 2010/0134628 A1 | 6/2010 | Pfitzner et al. |
| 2012/0234805 A1 * | 9/2012 | Schwarz .................. 219/121.63 |

FOREIGN PATENT DOCUMENTS

| | | |
|---|---|---|
| DE | 102007024789 B3 | 10/2008 |
| DE | 102009050784 A1 | 5/2011 |
| EP | 1415755 B1 | 9/2008 |
| WO | 2008052591 A1 | 5/2008 |

* cited by examiner

METHOD OF VERIFYING SEAM QUALITY DURING A LASER WELDING PROCESS

CROSS-REFERENCE TO RELATED APPLICATION

This application claims priority under 35 U.S.C. §119 to European Patent Application No. EP 11 180 542.0, filed on Sep. 8, 2011. The contents of this priority application are hereby incorporated by reference in their entirety.

TECHNICAL FIELD

The present disclosure relates to a method of verifying seam quality during a laser welding process.

BACKGROUND

When non-optimal welding parameters are set for laser radiation welding, welding defects may occur, which can lead to seam irregularities. Such irregularities may include incomplete penetration, humping (e.g., irregularities in the curvature of a weld bead), and holes. Observation of a welding process may enable the detection of various welding and seam defects. However, reliable detection of defects may be disrupted by process emissions, such as process plasma or thermal radiation from a metal vapor plume or result from a surface finish on the weld bead.

SUMMARY

The present disclosure relates to reducing a susceptibility of welding process monitoring to errors. In one aspect of the invention, a method of verifying a seam quality during a laser welding process includes detecting, in a spatially resolved manner, a first amount of radiation emerging from a workpiece during the laser welding process in a first wavelength range, determining a first geometric parameter of a seam characteristic based on the first amount of radiation detected in the first wavelength range, detecting, in a spatially resolved manner, a second amount of radiation emerging from the workpiece during the welding process in a second wavelength range, the second wavelength range being different from the first wavelength range, determining a second geometric parameter of the seam characteristic based on the second amount of radiation detected in the second wavelength range, comparing the first and second geometric parameters to respective reference values or to respective tolerance intervals to provide respective comparison results, and logically combining the respective comparison results to verify the seam quality. Radiation emerging from the workpiece may be radiation that is generated during the welding process or measurement light that is reflected from the workpiece.

In some implementations, spatially resolved observation of the welding process may occur in two different spectral ranges, and combined evaluation of resultant measured values may make the detection of seam irregularities more reliable. Combination of the measurements can occur after comparing the parameters to respective reference values or reference intervals. Since the result of such a comparison is generally a binary value, combination of the results may occur in the form of logical combining.

Simultaneous capture of different spectral ranges enables the determination of two different geometric parameters, which may be visible in one of the two spectral ranges used and refer to the same seam characteristic. For example, when butt-welding structural steel, full penetration may be detected by determining seam concavity as the first geometric parameter and weld pool length as the second geometric parameter.

A seam characteristic (e.g., a seam width) may also be determined as the first parameter by direct measurement, for example, by a light section, in the visible spectral range. Weld pool width, which is determined in the infrared wavelength range and is likewise a measure of seam width, may serve as the second seam width parameter.

The seam characteristic may be selected from the group including full penetration, seam width, humping, and a degree of asymmetry during welding of the workpieces.

To test full penetration, the presence or absence of a full penetration hole may, for example, be determined both in the visible and infrared wavelength ranges. In this case, the two geometric parameters are the same, and a redundant determination is carried out in the two different wavelength ranges. However, if the full penetration hole cannot be detected in one of the wavelength ranges (e.g., in the visible wavelength range), it may alternatively be possible to determine seam concavity or weld pool length as a parameter for full penetration.

As discussed above, the seam width may be determined in both wavelength ranges. Humping (i.e., variation in the curvature of the seam) may also be determined by detection of a light section in the visible range and by detection of variation of the heat trail width of the cooling seam in the infrared wavelength range.

Asymmetry during welding of the workpieces may arise, for example, if the workpieces exhibit a height discrepancy or a difference in thickness at the joint on welding, or if the two workpieces are made of materials with very different melting points, heat conduction properties, and/or heat capacities. To characterize a degree of asymmetry, the distance between the focal spot and the joint, which may be determined in the visible wavelength range, may serve as the first parameter, and the lateral position of the weld pool and/or the lateral position of the heat trail of the cooling weld seam in the infrared wavelength range may serve as the second parameter.

In some implementations, accuracy may be increased by accounting for the first geometric parameter when determining the second geometric parameter (or vice versa). For example, the influence of the first geometric parameter on the spatially resolved detected radiation in the second wavelength range or the spatially resolved measured radiant intensity may be taken into account. In some examples, the first geometric parameter may be a measure of the curvature of the weld bead, for example, a distance between the lowest or highest point on the top of the seam (perpendicular to the feed direction) and the workpiece surface, which may, for example, be determined with a light section.

Knowledge about the shape of the weld bead or the waviness thereof may be used to increase precision in determining parameters that are dependent on the heat trail (e.g., in the infrared spectral range) since the curvature of the weld bead influences the spectral beam density generated from the heat trail of the seam. In such a case, the spectral beam density depends both on temperature and on emissivity, wherein the emissivity is dependent inter alia on the angle of the seam surface relative to the detector beam path. Emissivity therefore depends on the shape or curvature of the seam surface or the weld bead. The curvature of the weld bead may therefore be used, as a first parameter, to compensate for the influence of the varying emissivity through the curved surface of the seam on the detected beam density of the thermal image and, for example, to enable determination of the width of the heat trail with greater accuracy.

In some implementations, seam quality is assessed as unsatisfactory if the parameter does not correspond to the reference value in at least one wavelength range or lies outside of the tolerance interval. Comparison of the parameter to the reference value or to the tolerance interval typically leads to a binary decision about the respective seam characteristic (e.g., full penetration present or not present, full penetration hole detected or not detected, seam width "OK" or unsatisfactory, humping present or not present, asymmetry present during welding or not present during welding, or weld point in correct place or not in correct place). These binary results may be logically linked for assessment of the respective seam characteristic. Thus, in some implementations, the seam quality may be assessed as "OK" if the result matches in both cases and indicates good seam quality (e.g., where the results are full penetration hole present or humping not present).

In certain embodiments, the method includes improving the seam quality by modifying parameters of the laser welding process. If the seam quality is assessed as unsatisfactory, an attempt may be made to modify the parameters of the welding process such that the seam quality again falls within the tolerance interval or corresponds to the reference value. Accordingly, welding parameters such as welding speed, laser radiation intensity, laser machining head position, and clamping forces of the workpieces to be welded, may be modified in a manner that improves the seam quality. For example, a closed-loop control may be provided as a result of the seam quality assessment. In some examples, if asymmetry of the fusion of the workpieces with regard to the joint or deviation of the focal spot from the desired weld position relative to the joint is determined as the seam characteristic, a control loop, which is typically present anyway and which serves for determining the lateral position of the focal spot relative to the joint, may be used for correction.

In some embodiments, the first wavelength range is the visible (VIS) spectral range, and the second wavelength range is the infrared (IR) spectral range. The VIS spectral range includes wavelengths of between about 380 nm and about 800 nm. The IR spectral range includes wavelengths of over about 800 nm to about 1 mm. The near infrared (NIR) range is used for some applications and includes wavelengths in the IR range that are about equal to or less than 2 μm.

For measurement in the two spectral ranges, two cameras with sensitivities in the VIS or NIR ranges may be used. Alternatively, a single camera with a dual bandpass filter in the beam path may be used to transmit visible radiation in one range and NIR radiation in another range, which are captured in different zones on the detector surface of the camera. The NIR range may additionally be subdivided into two or more sub-ranges, for example, in order to allow absolute temperature measurement on the basis of quotient pyrometry. Bandpass filters may be used in the camera beam path that transmit radiation or process light in the appropriate spectral range and exclude process light outside of the appropriate spectral range.

In certain embodiments, the first parameter is selected from the group including an extent of a full penetration hole, a distance between a laser focal spot and a joint, a curvature of the weld bead, and a seam width. In some examples, these parameters are particularly easy to measure in the VIS wavelength range. The location of the joint may, for example, be determined with the assistance of reflected light and/or light section illumination in order to determine the distance to the laser focal spot, whose position may typically likewise be detected in the VIS range. The location and shape of the imaged seam, for example, the curvature or the geometry of the weld bead, may also be detected with the assistance of light section illumination.

In some embodiments, the second parameter is selected from the group including an extent of a full penetration hole, a weld pool length, a weld pool width, a width of the heat trail, and a distance between a weld pool or a heat trail and a joint. For example, the weld pool and the heat trail adjoining this in the cooling melt of the material of the weld seam may readily be observed in the NIR wavelength range. The position of the laser focal spot may also be detected in this wavelength range.

In certain embodiments, the radiation detected in the first or second wavelength range may be used to determine at least one additional geometric parameter that is used to verify a plausibility of one or both of the first and second parameters. In some examples, the length of the weld pool may be determined as the additional parameter. The additional parameter may serve in the detection of a faulty measurement, for example, when determining the convexity or concavity of the weld seam using a light section. Such faulty measurements may occur if the length of the weld pool is so great that it extends into the surface zone in which the convexity or the concavity of the weld seam is to be determined using the light section.

In some implementations, a combination of evaluating measured values or parameters from both spectral ranges enables a more robust detection of weld seam irregularities. Combined evaluation of the measurement results may take place in a "frame grabber" of a camera used as detector, in an image processing computer (e.g., in a laser machining machine controlling the welding process), or in an external control unit.

Other aspects, features, and advantages will be apparent from the description, the drawings, and the claims. The above-stated features and those stated below may likewise each be used on their own or in any desired combinations. The embodiments illustrated and described should not be understood to be a comprehensive list, but rather, are used as examples to describe the embodiments.

DETAILED DESCRIPTION

Figure 1:
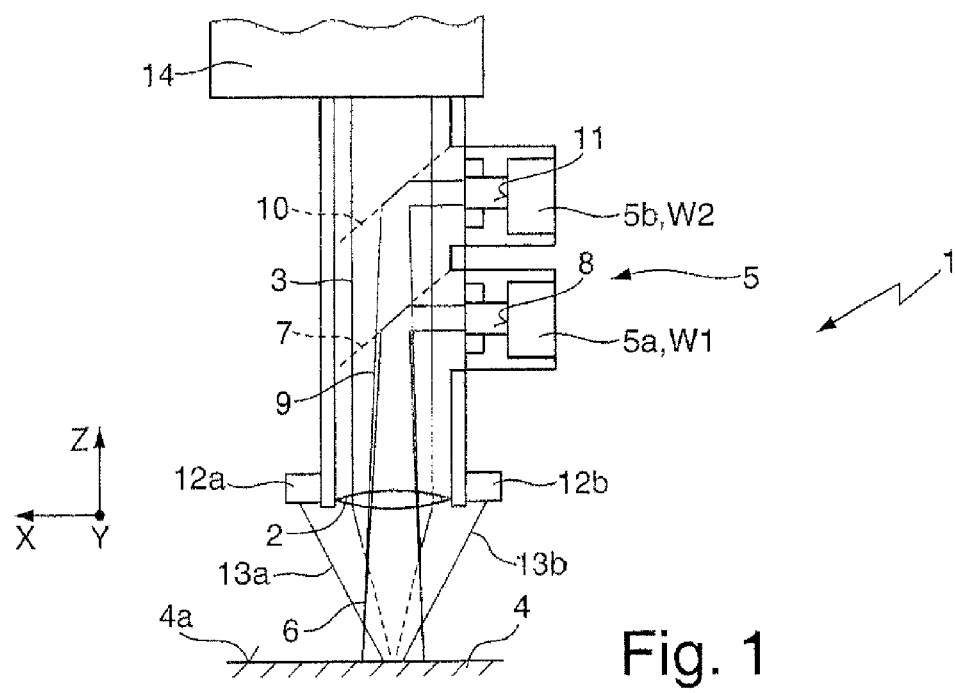
FIG. 1 is a schematic representation of a laser machining head with two cameras for detecting radiation in two different wavelength ranges.

FIG. 1 shows a laser machining head 1 with a focusing lens 2, which focuses a laser beam 3 supplied to the laser machining head 1 onto a focal area on a workpiece surface 4a. The laser beam 3 is focused on a region of a joint site between two workpieces 4 in order to perform laser welding at the site. To monitor the welding process, a sensor device 5 with a CMOS camera 5a and an InGaAs camera 5b is provided on the laser machining head 1.

A beam path 6 of the CMOS camera 5a is reflected onto the workpiece surface 4a by a partially transmissive deflecting mirror 7. In this case, not only the focal area of the laser beam 3, but also a relatively large portion of the workpiece 4 in the area surrounding the laser beam 3 is imaged onto a detector surface 8 of the CMOS camera 5a. Like the beam path 6 of the CMOS camera 5a, a beam path 9 of the InGaAs camera 5b is also reflected onto the workpiece surface 4a by a deflecting mirror 10 and images the portion of the workpiece 4 in the area surrounding the laser beam onto a corresponding detector surface 11. On the laser machining head 1, there are additionally provided two line projectors 12a, 12b associated with the sensor unit 5, which project two laser light lines 13a, 13b into the beam paths 6, 9 monitored by the CMOS camera 5a and the InGaAs camera 5b. The laser light lines 13a, 13b are hereinafter also called light sections 13a, 13b.

As a function of the measurement data captured by the cameras 5a, 5b, the laser machining head 1 may be displaced along a first adjusting axis (e.g., a Y axis of an XYZ system of coordinates, where the X direction is the feed direction) implemented as a linear axis, so as to bring the laser beam 3 to its optimum (e.g., lateral) welding position. A second adjusting axis (e.g., a Z axis of the XYZ system of coordinates) may be used additionally to vary the distance between the laser machining head 1 and the workpiece surface 4a. Accordingly, a beam guide means 14 of the laser machining head 1 is displaceable in the respective axial direction by means of linear drives (not shown).

Still referring to FIG. 1, the CMOS camera 5a serves to capture (e.g., to detect) radiation in a spatially resolved manner in a first wavelength range W1, for example, the visible (VIS) range (e.g., to capture wavelengths of between about 380 nm and about 800 nm). The InGaAs camera 5b serves to capture (e.g., to detect) radiation in a spatially resolved manner in a second wavelength range W2, for example, the near infrared (NIR) range (e.g., to capture wavelengths of between about 800 nm and about 2 μm). The NIR wavelength range W2 may additionally be subdivided into two or more subranges in order to allow, for example, absolute temperature measurement on the basis of quotient pyrometry. In the respective beam paths 6, 9 of the cameras 5a, 5b, respective bandpass filters (not shown) may be used to transmit process light in the appropriate spectral range and, to the extent possible, to reject process light outside of the spectral ranges W1-W2.

In some embodiments, the arrangement of the cameras 5a, 5b relative to the beam path of the laser beam 3 may be different from that shown in FIG. 1. For example, just one deflecting mirror may be arranged in the beam path of the laser beam 3, and assignment of the respective beam paths 6, 9 to the cameras 5a, 5b may occur via a beam splitter. In some embodiments, a single camera (e.g., a camera with a dual bandpass filter in the beam path) may be used, which in a first zone, transmits radiation in the VIS wavelength range W1 and in a second zone transmits radiation in the NIR wavelength range W2, which impinges on different areas of the detector surface of the camera. Furthermore, non-coaxial observation is possible, in which the beam paths 6, 9 of the cameras 5a, 5b are not congruent with the beam path of the laser beam 3.

Figure 2:
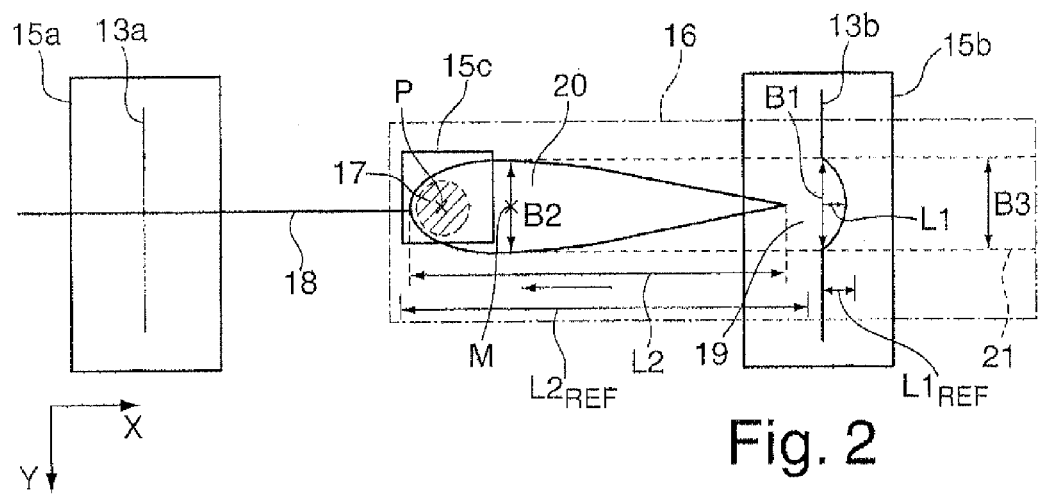
FIG. 2 is a schematic representation of a plan view of various measurement zones that are used to determine parameters for seam characteristics during a laser welding process.

FIG. 2 illustrates a plan view of various measurement zones at the detector surface 8 that are used to determine parameters for seam characteristics during a laser welding process. In some implementations, a quality of the seam may be improved by modifying such parameters of the laser welding process. Three measurement zones 15a-15c are arranged at the detector surface 8 of the CMOS camera 5a along a welding direction (e.g., an X direction) indicated by an arrow in FIG. 2. During the welding process, the first measurement zone 15a (e.g., a pre-measurement window) captures a portion of the workpieces 4 while being moved forward to a focal spot 17, which is produced by the laser beam 3. In the first measurement zone 15a, a position or a shape of a joint 18 between the workpieces 4 is captured using the first laser light line 13a (i.e., the light section 13a shown in FIG. 1). Alternatively, the joint 18 may also be extensively illuminated by the light section 13a and captured in the reflected light.

In the second measurement zone 15b (e.g., a post-measurement window), radiation is detected after welding. For example, the second laser light line 13b allows information to be obtained about the geometry (e.g., a convexity or a concavity) of a weld seam 19. The third measurement zone 15c (e.g., an in-measurement window) allows for observation of the direct welding zone with the focal spot 17, which corresponds to the area at which the laser beam 3 impinges on the workpiece surface 4a.

At the sensor face 11 of the InGaAs camera 5b, a measurement zone 16 is evaluated, which captures thermal radiation in the region of the focal spot 17 of the adjacent weld pool 20 and a heat trail 21 (illustrated schematically in FIG. 2) of a cooling melt that adjoins the weld pool 20. The respective measurement zones 15a-c, 16 correspond to the zones in which the intensity of the light irradiated onto the respective sensor faces 8, 11 are evaluated by an evaluation device (not shown). Combined evaluation of the measurement results may take place in a "frame grabber" of the camera 5a, 5b used as a detector in an image processing computer (e.g., in a laser machining apparatus that controls the welding process, or alternatively, in an external control unit). Although the measurement zones 15a-c, 16 have rectangular shapes in the example embodiment of FIG. 2, in other embodiments, the measurement zones 15a-c, 16 may take on other shapes or geometries. In a general embodiment, the number of measurement zones may also vary.

Using the cameras 5a, 5b, a first or second geometric parameter may be determined in the first or second wavelength range W1, W2, respectively, that describes the same seam characteristic. The geometric parameter may take the form, for example, of a spatial extent or a geometry of a full penetration hole that lies within the region of the focal spot 17 in the example shown in FIG. 2. When using a solid-state laser to generate the laser beam 3, the full penetration hole is visible in both VIS and NIR wavelength ranges W1, W2, respectively. In such a case, the first and second parameters describe the same geometric variable (e.g., the extent, and in particular, the size of the full penetration hole). By simultaneous detection of the full penetration hole in both spectral ranges W1, W2, plausibility testing can be performed, and the detection rate can be increased.

The full penetration hole may be captured as a spatially delimited, reduced illuminance on the cameras 5a, 5b within the respective measurement zone 15c, 16 in the area surrounding the focal spot 17. Additional criteria, such as a minimum size of a detected hole, a contrast, or a location of the detected hole, may be taken into consideration as reference values for detection. In some implementations, comparison of the spatially delimited, reduced illuminance to the respective reference value leads either to detection or to no detection of the full penetration hole and thus yields a binary result (e.g., a full penetration hole present or a full penetration hole not present). Accordingly, the two results of the comparison in the two spectral ranges W1, W2 may be logically combined in order to assess seam quality. In some implementations, the welding process or seam quality may be assessed as satisfactory or as "OK" if the full penetration hole is detected in both spectral ranges W1, W2 (i.e., when the full penetration hole is present).

Still referring to FIG. 2, when welding with a $CO_2$ laser, the full penetration hole may only be visible in the NIR spectral range W2 since the full penetration hole is concealed in the VIS spectral range W1 by plasma in a keyhole. In the NIR spectral range W2, the full penetration hole may additionally be directly detected as a full penetration parameter. In some implementations, when butt-welding structural steel, the concavity of the weld seam 19 formed may additionally be determined as a parameter in the VIS spectral range W1 using the second light section 13b. In such a case, a distance L1 between the workpiece surface 4a and the lowest or highest point of the seam serves as a measure of convexity or concavity, where both variables or the distance L1 may be simply determined using the second light section 13b, as illustrated in FIG. 2. The distance L1 measured in this way is compared with a reference distance L1REF determined, for example, during test welding. A weld pool length L2 is an additional parameter that can be detected in the NIR spectral range W2. If the weld pool length L2 is smaller than a predetermined reference value, (e.g., L2REF, determined by test welding), this may be indicative of full penetration. Thus, if the distance L1 corresponds to the reference distance L1REF, the length L2 is smaller than the reference value L2REF, and the presence of the full penetration hole is detected, the seam characteristic "full penetration" may be assessed as "OK."

When measuring a width of the seam 19, plausibility testing may be performed via measurement in both spectral ranges W1, W2. For example, a seam width (B1) may be determined as a first parameter in the VIS spectral range W1 via the second light section 13b. The result of comparing the width B1 with a reference value BREF (shown in FIG. 3) is verified by measuring a second parameter, a weld pool width B2 (shown in FIG. 2). The width B2 of the weld pool 20 in the NIR spectral range W2 typically corresponds to the seam width B1 and is likewise compared with the reference variable BREF, which corresponds to a desired (e.g., ideal) weld seam width.

In some implementations, measurement of the seam width B1 via the second light section 13b and measurement of the weld pool width B2 in the NIR wavelength range W2 may occur at different locations in the welding direction (e.g., the X direction as shown FIG. 2). Accounting for a weld speed or a time offset, the widths B1, B2 determined in each case may be assigned to the same position along the weld seam 19 in order to perform the comparison between the parameters B1, B2 at the same location.

Figure 3:
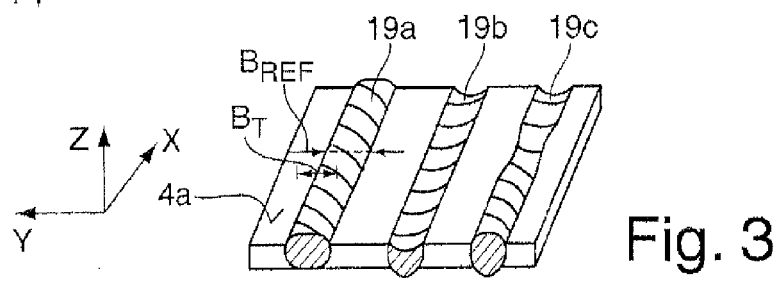
FIG. 3 is a schematic representation of a workpiece with three differently curved weld seams.

FIG. 3 illustrates a workpiece with three different weld seams that have different curvatures. In some implementations, the width B1 of the weld seam 19 (shown in FIG. 2) does not match the reference width BREF exactly. However, differences between the width B1 of the weld seam 19 and the reference width BREF that are within a tolerance interval BREF+/−BT may be assessed as tolerable for seam quality, and consequently, seam quality may be assessed as satisfactory. For example, the seam quality may be assessed as satisfactory if B1 lies substantially between BREF−BT and BREF+BT or if B2 lies substantially between BREF−BT and BREF+BT. Accordingly, the seam quality may be assessed as unsatisfactory if B1 does not lie substantially between BREF−BT and BREF+BT or if B2 does not lie substantially between BREF−BT and BREF+BT.

Still referring to FIG. 3, in some implementations, "humping" (i.e., a seam defect that describes a variation in the seam convexity or concavity) of the seam 19 may be detected as an additional seam characteristic. For example, a first weld bead 19a exhibits a seam convexity, a second weld bead 19b exhibits a seam concavity, and a third weld bead 19c provides a transition between the seam convexity and the seam concavity.

Referring again to FIG. 2, a regularly recurring variation in seam curvature (e.g., humping) may be detected by determining the distance L1 between the workpiece surface 4a and the lowest or highest point of the seam 19 in the VIS wavelength range W1 using the second light section 13b. For example, variation in the length L1 (e.g., as measured as a variance or a difference between the minimum and maximum) over a predetermined period of time can serve as the first parameter. The second parameter can be measured as a variation in a width B3 of the heat trail 21 in the NIR wavelength range W2 over the same period of time since the width B3 of the heat trail 21 is dependent on the seam convexity or concavity. In some examples, the width B3 of the heat trail 21 is dependent on the convexity or concavity because more molten material is present at seam convexities, such that the detected heat trail becomes wider. If the result of a comparison of the two parameters with a respective reference value for the variation is that the variation lies within a tolerance range, it may be concluded that humping is not present, and thus, seam quality may be assessed as acceptable.

Asymmetry during fusion of the workpieces 4 provides an additional seam characteristic. Such asymmetry may result due to a height discrepancy or a difference in thicknesses of the workpieces 4 at the joint 18 or, in the case of workpieces of different materials (e.g., steel and cast iron), due to the workpieces exhibiting different melting points, different heat conduction properties, or different heat capacities. For weld asymmetry, the distance between the lateral position of the focal spot P and the joint 18 may be measured as the first parameter in the VIS spectral range W1. In parallel, in the NIR wavelength range W2, the distance may be measured between the lateral position of the weld pool 20 and/or the heat trail 21 and the joint 18 or the position P of the focal spot 17.

In some implementations, the seam quality is assessed as "OK" if the position P of the focal spot relative to the joint 18 is the first parameter, and the center of gravity of the weld pool 20 or a middle M of the weld pool 20 at its widest point of the area center of gravity of the heat trail 21 in a direction transverse to the joint 18 is the second parameter and exhibits a reference distance previously determined, for example, by test welds, or the distance is smaller than said established reference distance (e.g., the distance in FIG. 2 is equal to zero).

If upon comparison of at least one of the two parameters with this reference distance, too great a deviation arises, a seam location control system control loop may be used to compensate for the asymmetry during fusion of the parts to be joined. Furthermore, the control loop may be used to increase the accuracy of the seam location control system, for example, by correcting the position of the laser machining head 1 in a direction that is transverse to the joint gap 18 (e. g., in the Y direction as shown in FIG. 2). This is particularly favorable if, upon joining a pair of materials, a defined mixing ratio of the materials is established in the weld seam 19. In some implementations, even if an unsatisfactory seam quality is detected, appropriate adjustment of laser welding process parameters may be carried out using the above-described seam characteristics. Example welding parameters that may be modified include laser intensity, welding speed, and other parameters.

Referring to FIGS. 2 and 3, in the case of flat weld beads, (e.g., seams lacking curvature), measurement of the weld bead width B1 and the lateral weld bead position with the second light section 13b in the VIS spectral range W1 may be problematic, since light section measurements may require a contour modification perpendicular to the workpiece surface. In contrast, local convexity or concavity of the weld beads 19a-c may be measured with the light section as the first parameter. In the NIR wavelength range W2, the weld pool width B2 may be determined as the second parameter and thus may effectively correspond to the weld bead width, but not to the convexity or concavity of the weld bead 19a-c (see, for example, FIG. 3). Using combined measurements in both wavelength ranges W1, W2, both the weld bead width and local seam convexities or concavities may be measured for flat weld seams. Seam quality, and thus, the welding process, are assessed as "OK" if the two parameters L1, B2 display values established by test welds or lie within tolerance ranges that have been previously established.

To evaluate the above-described measurement, the weld pool length L2 may be used as an additional parameter. For example, the weld pool length L2 is checked to determine whether it exceeds a predetermined reference length, which need not necessarily match the reference length L2REF for assessment of full penetration. If L2 does exceed the predetermined reference length, the weld pool 20 may project at its rear end into the region of the light section 13b, such that the measurement of seam convexity or concavity in the VIS wavelength range W1 is generally incorrect. If the result of the comparison with the reference length is that the weld pool 20 is too long, the corresponding measurement of the length L1 by means of the second light section 13b in the VIS wavelength range W1 may not be used to determine the convexity or concavity of the seam. In some implementations, the weld pool length L2 thus serves as a confirmation of the plausibility of the determination of the length L1 as a measure of the concavity or convexity of the weld bead 19a-c.

In some implementations, when determining one of the two parameters, it is beneficial to account for the other parameter to increase precision. For example, the spectral radiance, which is based on the heat trail 21 of the welding process in the NIR wavelength range W2, is influenced by the (absolute) temperature and the emissivity at the surface of the weld bead 19a-c. Emissivity is, however, dependent on the angle at which the radiation 9 (see FIG. 1) to be detected is emitted from the weld bead 19a-c (i.e., emissivity is influenced by the shape of the weld bead).

As discussed above, the shape of the weld bead 19a-c may be determined using light section measurement in the VIS spectral range W1. In such a case, the length L1 between the workpiece surface 4a and the lowest or highest point of the weld bead 19a-19c may serve as a measure of the convexity or concavity of the weld bead 19a-19c. The parameter, determined in this way, may be used in the evaluation of the heat trail 21 of the seam 19 in the NIR spectral range W2 in order to computationally compensate for the influence of the varying emissivity of the curved surface of the seam 19 on the detected beam density. In this way, accuracy when determining the second parameter in the form of the seam width B3 in the NIR wavelength range W2 may be improved by determining the convexity or concavity of the weld bead 19a-c.

As discussed above, assessment of seam quality may be further validated by determining two parameters for the same seam characteristic so that process monitoring is more reliable. In some implementations, more than two parameters may be used to assess the same seam characteristic, where the seam characteristic is assessed as "OK" when the more than two parameters lie within the respective tolerance range or match the reference value. In some implementations, multiple seam characteristics may be monitored or verified in parallel. In such cases, the welding process may be assessed overall as "OK" if each individual seam characteristic is assessed as "OK".

A number of embodiments have been described. Nevertheless, it will be understood that various modifications may be made without departing from the spirit and scope of the disclosure. Accordingly, other embodiments are within the scope of the following claims.

What is claimed is:

1. A method of verifying a seam quality during a laser welding process, the method comprising:
   detecting, in a spatially resolved manner, a first amount of radiation emerging from a workpiece during the laser welding process in a first wavelength range;
   determining a first geometric parameter of a seam characteristic based on the first amount of radiation detected in the first wavelength range;
   detecting, in a spatially resolved manner, a second amount of radiation emerging from the workpiece during the laser welding process in a second wavelength range, the second wavelength range being different from the first wavelength range;
   determining a second geometric parameter of the seam characteristic based on the second amount of radiation detected in the second wavelength range;
   comparing the first and second geometric parameters to respective reference values or to respective tolerance intervals to provide respective comparison results; and
   logically combining the respective comparison results to verify the seam quality.

2. A method according to claim 1, wherein the seam characteristic is selected from the group comprising: a full penetration, a seam width, a humping, and a degree of asymmetry during welding.

3. A method according to claim 1, wherein the first geometric parameter is accounted for when determining the second geometric parameter to increase an accuracy.

4. A method according to claim 3, wherein the first geometric parameter is a measure of a curvature of a weld bead.

5. A method according to claim 1, wherein the seam quality is assessed as unsatisfactory if in at least one of the first and second wavelength ranges, a geometric parameter does not correspond to a respective reference value or lies outside of a respective tolerance interval.

6. A method according to claim 5, further comprising improving the seam quality by modifying welding parameters of the laser welding process.

7. A method according to claim 1, wherein the first wavelength range comprises a visible spectral range, and the second wavelength range comprises an infrared spectral range.

8. A method according to claim 1, wherein the first geometric parameter is selected from the group comprising: an extent of a full penetration hole, a distance between a position of a laser focal spot and a joint, a curvature of a weld bead, and a seam width.

9. A method according to claim 1, wherein the second geometric parameter is selected from the group comprising: an extent of a full penetration hole, a weld pool length, a weld pool width, a width of a heat trail, and a distance between a weld pool or the heat trail and a joint.

10. A method according to claim 1, wherein at least one additional geometric parameter is determined using the first or second amounts of radiation detected in the first or second wavelength ranges, respectively, and is used to verify a plausibility of one or both of the first and second geometric parameters.

11. A method according to claim 10, wherein the additional geometric parameter is a length of a weld pool.

* * * * *